United States Patent [19]

Bartolomeo

[11] Patent Number: 4,618,256
[45] Date of Patent: Oct. 21, 1986

[54] STROBOSCOPIC METHOD FOR DETERMINING GEAR MESH QUALITY

[75] Inventor: Mark E. Bartolomeo, Vernon, Conn.

[73] Assignee: Eaton Corporation, Cleveland, Ohio

[21] Appl. No.: 722,477

[22] Filed: Apr. 12, 1985

[51] Int. Cl.$^4$ .......................... G01P 3/40; G03B 1/00
[52] U.S. Cl. .................................... 356/23; 354/120; 73/162
[58] Field of Search ................ 356/23, 24; 354/77, 354/110, 120; 73/162

[56] References Cited

U.S. PATENT DOCUMENTS 4,370,039 1/1983 Landwehr .................... 354/120 X

Primary Examiner—Eugene R. LaRoche
Assistant Examiner—D. C. Mis
Attorney, Agent, or Firm—C. H. Grace; A. E. Chrow

[57] ABSTRACT

Disclosed is a stroboscopic method of determining the quality of meshing between respective teeth of two or more gears. By way of example, a method is disclosed by which a standard is established by directing an adjustable pulse rate light beam (L) from a stroboscopic light source (18) towards a region (R) generally encompassing the location of meshed engagement between respective teeth (6; 8) of a pair of gears (2, 4) rotating at a predetermined rpm that are selected on the basis that they possess degree of mesh engagement quality desired for such gear pairs. One of gears (2, 4) is rotated at the predetermined rpm by an adjustable drive means such as a motor (14) and the pulse rate of light beam (L) is synchronized with the predetermined gear rpm to provide a pattern of light refractance interference lines that can be recorded and used as a standard against which the light refractance interference pattern of other gear arrangements of the same type and at the same rpm and direction and light beam pulse rate can be compared to determine the quality of mesh engagement between the respective teeth thereof.

3 Claims, 3 Drawing Figures

U.S. Patent   Oct. 21, 1986   4,618,256
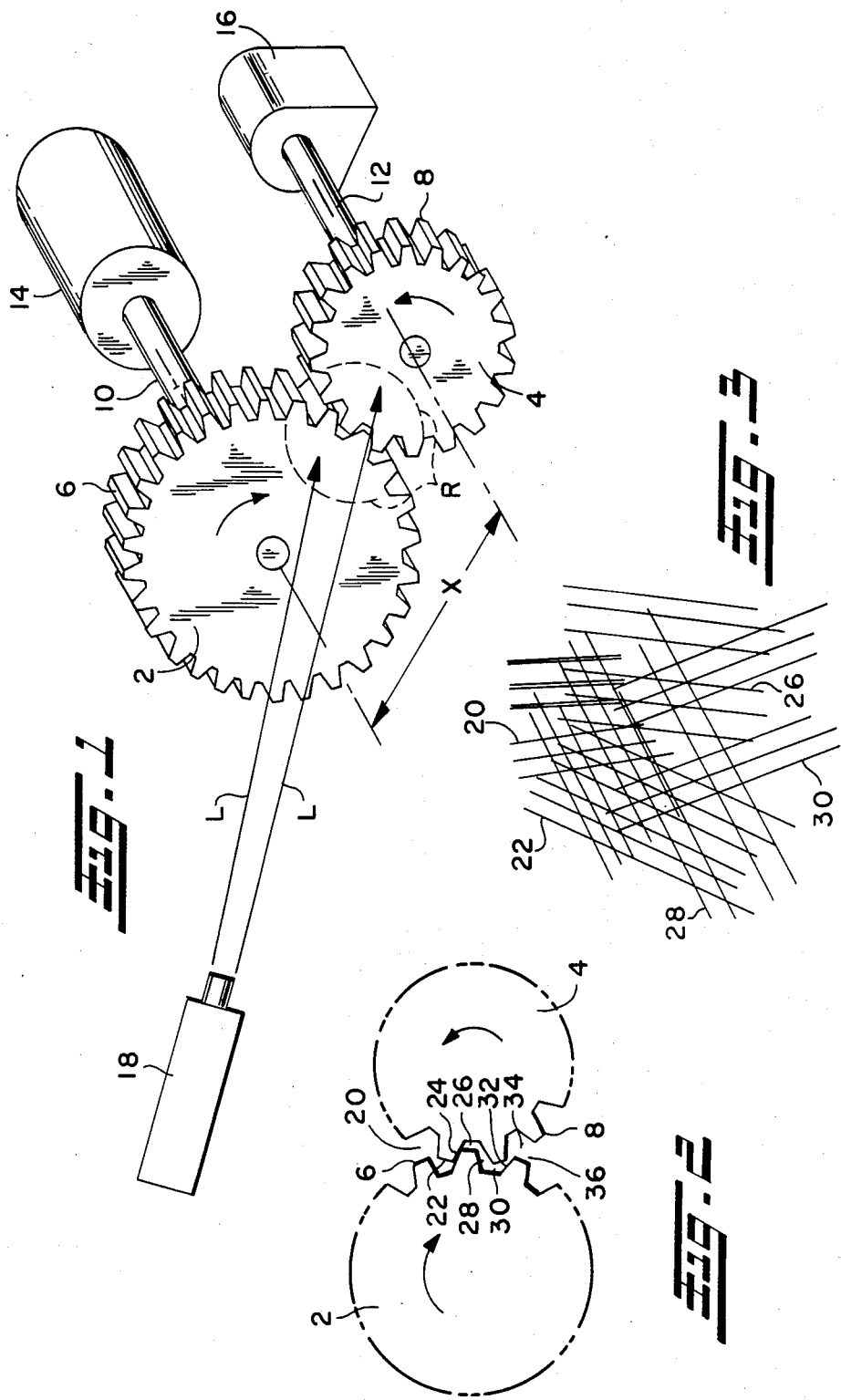

4,618,256

STROBOSCOPIC METHOD FOR DETERMINING GEAR MESH QUALITY

INTRODUCTION

This invention is related to a method for determining quality of meshing between meshed rotating gear teeth and more particularly to a method employing stroboscopic and optical refractance principles as a highly accurate tool in providing information concerning the quality of engagement between rotating gear teeth.

BACKGROUND OF THE INVENTION

The manner in which respective teeth of a rotating gears mesh is a subject that has been studied for many years for there exists an optimum quality of meshed engagement between their respective teeth that enables maximum power transfer between the gears with minimum noise and wear to the teeth. The quality of meshed engagement between rotating gear teeth includes such factors as the shape and surface finish of the respective teeth, concentricity, and the pitch diameter line of contact therebetween as is well known to those skilled in the art.

The fact that a particular gear pair has been matched to provide a desired quality of meshed engagement therebetween does not mean that such is readily reproduceable in a manufacturing environment due to factors including variations in metal quality, variations in lubrication, and tool wear that are apt to occur during the process of making a quantity of the particular gear pair.

In order to ascertain and maintain a desired quality of meshed engagement between a quantity of manufactured gear pairs, many tests have been devised over the years to compare the mesh engagement quality of a particular chosen gear pair set with some pre-established quality standard. The tests, however, have characteristically been mechanical in nature involving various means for measuring displacement of at least one of the gears, analyzing noise levels while rotating, or perhaps examining shadow grams of the gear pair in a stationary condition. Although such tests have been helpful, they often require costly equipment and may lack the level of accuracy and repetitivity desired.

A need, therefor exists, to provide a simple, low cost, highly repetitive and accurate method of determining gear mesh quality between selected gear pairs which eliminates the highly mechanical nature of such methods heretofor used. It has been discovered quite by accident that such need is highly satisifed when the mechanical elements heretofor employed for such measurement are eliminated and replaced by stroboscopic and optical refractance principles.

SUMMARY OF THE INVENTION

Accordingly, it is an object of this invention to provide a method of determining mesh engagement quality between the teeth of rotating gears.

It is another object of this invention to provide a method of determining mesh engagement quality between the teeth of rotating gears for which the mechanical elements heretofore used for such measurement are eliminated.

It is a further object of this invention to provide a method of determining gear mesh engagement quality between gear teeth that is simple, low cost, repetitive and highly accurate.

It is still another object of this invention to provide a highly effective and accurate method of determining mesh engagement quality between gear teeth that replaces mechanical elements heretofor used for making such determination with stroboscopic and optical refractance principles.

BRIEF DESCRIPTION OF THE DRAWINGS

FIG. 1 shows an embodiment of the invention.

FIG. 2 shows in detail the meshed engagement between the teeth of gears 2 and 4 of FIG. 1.

FIG. 3 show typical refractance lines produced by the invention.

DETAILED DESCRIPTION OF THE INVENTION

FIG. 1 shows an embodiment of the method of the invention by which the mesh engagement quality of gear 2 and gear 4 is being determined. Gears 2 and 4 comprise a gear pair that are spaced-apart a predetermined distance "x" so that their respective teeth 6 and 8 engage each other in the manner desired for a particular application. Theoretically, each of gears 2 and 4 is provided with a pitch diameter along the respective teeth thereof at which the teeth engage each other as both gears rotate.

Gear 2 and gear 4 are mounted for rotation on shafts 10 and 12, respectively. Shaft 10 is operably connected to motor 14 which is a variable speed motor capable of rotating gear 2 at a predetermined rpm. Gear 4 is mounted for rotation on shaft 12 which is rotatably supported by a suitable journal housing 16. In FIG. 1, gear 2 is the driver gear and gear 4 is the driven gear whereby gear 4 is caused to rotate in an opposite direction to the rotational direction of gear 2 as, for example, shown by the arrows.

Although not shown in FIG. 1, motor 14 and journal 16 are mounted on a fixed frame and able to be moved away from and towards each other by suitable means such as a rack and pinion arrangement to change distance "x" to accommodate different size gear combinations.

Motor 14 is a suitable adjustable speed motor able to be controlled by an operator to rotate at a plurality of operator selected rpm's so that the operator is able to rotate gears 2 and 4 at a particular rpm desired.

An adjustable pulse frequency light source 18 is positioned at a predetermined location with respect to gears 2 and 4 so that light beam "L" emitted therefrom can be directed towards region "R" which generally encompasses the location at which teeth 6 and gear 2 and teeth 8 of gear 4 mesh with each other. Light source 18 is a stroboscopic light source whose pulse rate of emitted light is able to be controlled by an operator. In practicing the method of the invention, the pulse rate of light source 18 is adjusted such that light is emitted at a pulse rate per minute that is substantially the same as the rpm of gears 2 and 4 or multiple harmonics thereof as is well known to those skilled in stroboscopic art. The effect is to cause gears 2 and 4 to appear to be apparently stopped to a viewer although they both are actually rotating. Although common stroboscopic lighting may be use, it has been found that light emitted from a fluorescent light source can be used to particular advantage. The position of the light source with respect to the gear pair being examined also depends upon the nature of the gear pair which includes situations where the gears are not in the same rotational plane but rather are angularly disposed with respect to each other such as, for example, at 90 degrees in a typical pinion gear - ring gear differential arrangement.

It has been found that a pattern of light interference lines become visible to the eye that appear to be on the surface of the gears when the synchronized stroboscopic light is directed towards the mesh engagement region "R" which can, of course, be changed by repositioning the stroboscopic light source with respect to the gear pair being examined. The pattern of light interference lines thus become a type of "fingerprint" of the particular gear pair being examined which can be adjusted to a particular pattern desired by changing the position of the stroboscopic light source. Although light beam "L" is shown as being directed directly toward the gear pair of FIG. 1, it is to be understood that the use of mirrors and the like, including lenses of various types, are included within the scope of the invention where applicable to alter the path of the stroboscopic light beam before it impinges upon the gear pair. Further, the stroboscopic light source may have a fixed position with respect to the gear pair being examined and the direction of its light beam controlled by adjustable mirrors to impinge on the gear pair from the direction desired.

It is believed that the interference lines result from slit refractance principles well known to those skilled in the art. In FIG. 2, the meshed engagement between teeth 6 of gear 2 and teeth 8 of gear 4 is shown in greater detail. It is apparent that for a particular instant in time which is stopped by the stroboscopic effect there exists at least slits 20, 22, 24, 26, 28, 30, 32, 34 and 36 as shown in FIG. 2. As is now believed with those skilled in the art of slit interferometry, reflected light from opposite edges of the slits intercept each other to provide the well known refractance lines such as shown, for example, in FIG. 3 where, for illustrative purposes, refractance lines for slits 20, 22, 26, 28 and 30 are shown. Reference 24 is the actual point of contact between teeth 6 and 8 and no slit is provided and therefor no refractance lines are produced although such refractance lines may arise where the edges of the teeth are curved prior to the actual point of contact. Although shown in straight lines, the interference lines may actually be curvilinear due to the curved profile of typical gear teeth.

The appearance of the light refractance pattern can be used to great advantage as a method of determining the gear mesh quality of selected gear pair sets. In order to practice the invention, a standard must be established against which subsequent gear pairs of the same type can be prepared. Thus, a particular gear pair set can be selected that is known to have the degree of mesh engagement quality desired. The gear pair can be rotatably mounted and rotated at the rmp desired and the stroboscopic light source positioned and synchronized to provide the pattern of light interference lines desired for establishing the standard. The standard pattern can thus be recorded by photography or other suitable means. Then either one or both of the standard gear pair can be replaced with another selected gear of the same type and the interference pattern recorded or at least observed against the standard when run at the same rpm or substantially the same rpm as the standard gear pair while maintaining the position and rpm synchronization established for the stroboscopic light source for the standard gear pair. Such method can thus be a highly accurate means of comparing the interference pattern of the gear pair under test against the standard to determine mesh engagement quality.

Although a gear pair is shown for illustrative purposes, understandably the mesh engagement quality of the meshing of more than two gears can, when suitable, be determined by the method of the present invention.

What is claimed is:

1. A stroboscopic method of determining gear mesh quality, said method including the steps of:
    (a) mounting at least two gears of a given type for rotation in meshed engagement between the respective teeth thereof predetermined to provide the degree of mesh engagement quality desired therefor for a predetermined rpm of said gears,
    (b) providing means for rotating one of the gears of step (a) at the predetermined rpm,
    (c) providing a stroboscope light source having an adjustable pulse rate for a light beam emitted therefrom,
    (d) rotating the gear of step (b) at the predetermined rpm,
    (e) adjusting the pulse rate of the light beam of step (c) to substantially match the gear rpm of step (d),
    (f) directing the light beam of step (e) at a region encompassing the meshed engagement between the respective teeth of the gears of step (a) in a direction predetermined to establish a visible light refractance interference pattern for said gears depicting the standard of mesh engagement quality characteristic thereof,
    (g) recording the standard pattern established in step (f),
    (h) replacing at least one of the gears of step (a) with a gear of the same type,
    (i) repeating steps (d) through (f) at the predetermined rpm and without changing the direction of the light beam to provide a light refractance interference pattern characteristic thereof,
    (j) comparing the pattern of step (i) to the established standard pattern of step (g) to determine the gear mesh quality of the gears of step (h).

2. The method of claim 1 including the step of recording the pattern of step (i).

3. The method of claim 1 wherein the light source is a fluorescent light source.

* * * * *